Dec. 1, 1931.    A. BJORKLUND    1,834,762
SPLITTING MACHINE
Filed March 8, 1929    4 Sheets-Sheet 1

Inventor
Arvid Bjorklund
By his Attorneys

Dec. 1, 1931.  A. BJORKLUND  1,834,762
SPLITTING MACHINE
Filed March 8, 1929  4 Sheets-Sheet 2

Inventor
Arvid Bjorklund
By his Attorneys
Merchant and Kilgore

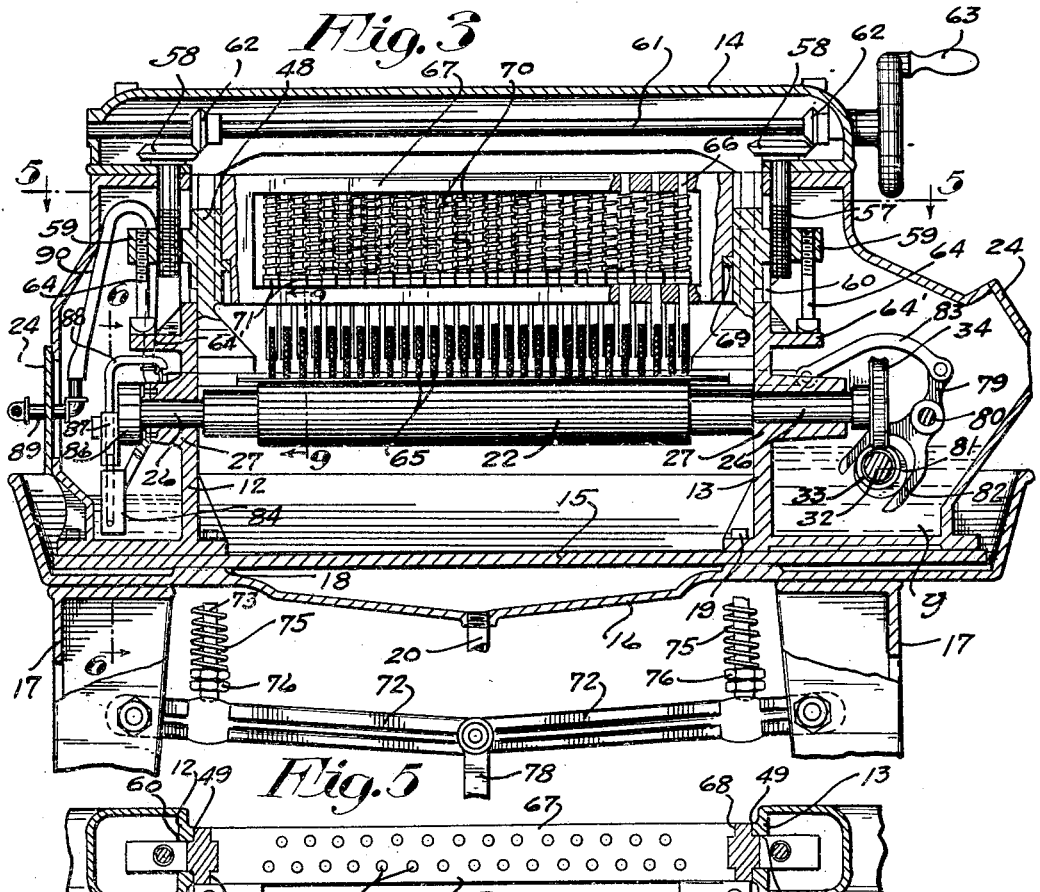
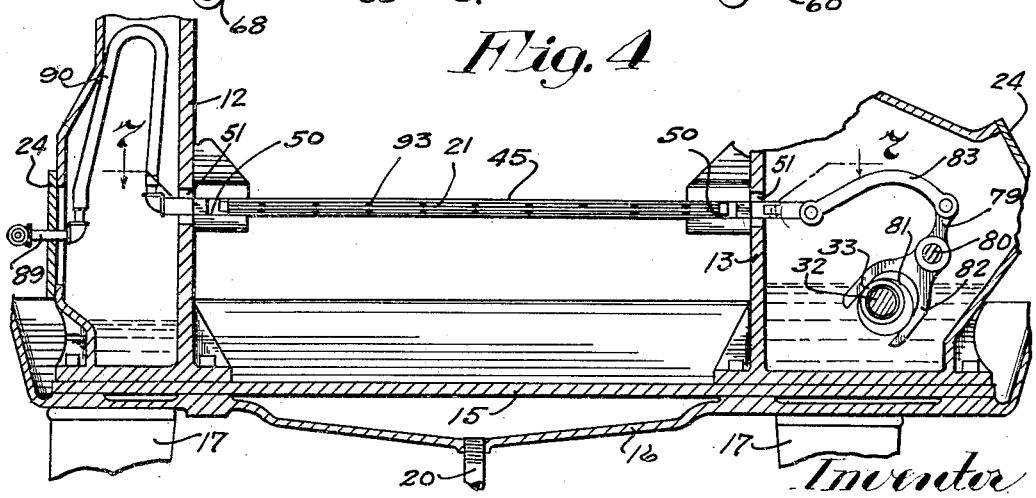

Dec. 1, 1931.  A. BJORKLUND  1,834,762
SPLITTING MACHINE
Filed March 8, 1929  4 Sheets-Sheet 4
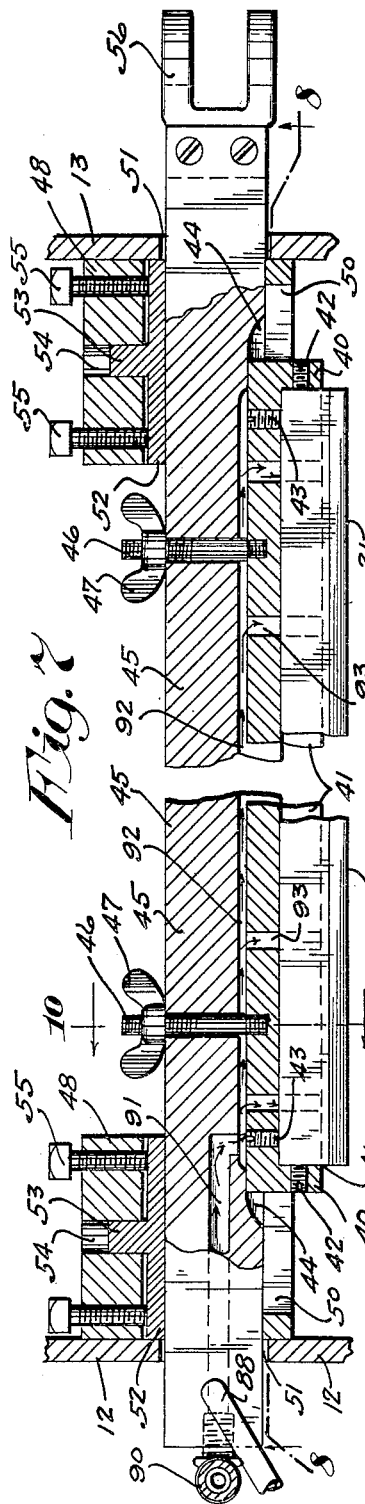
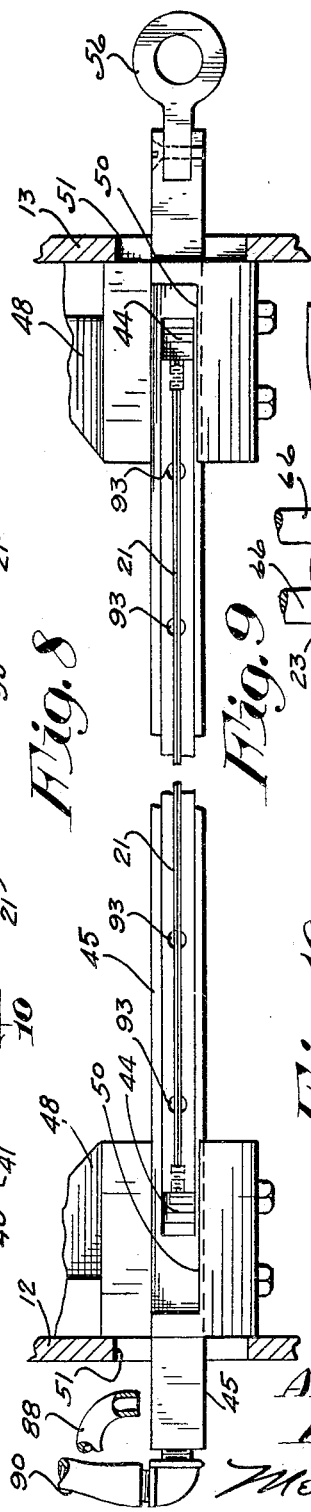
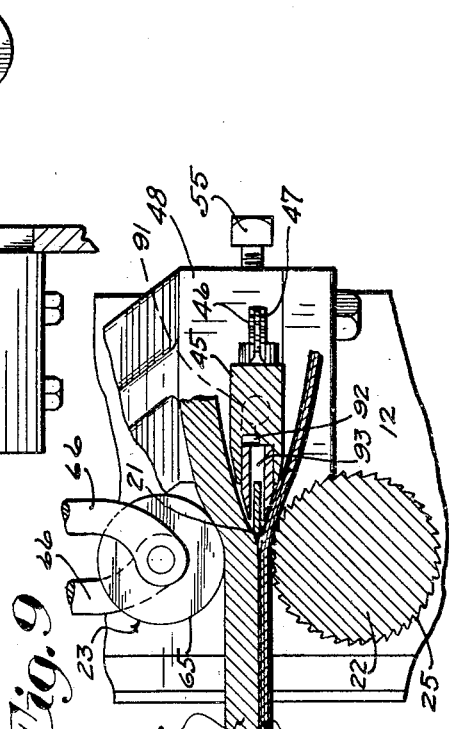
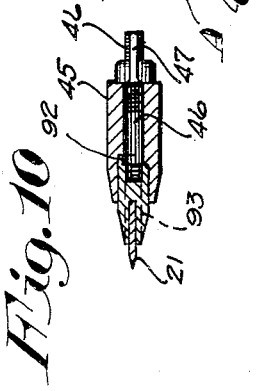
Inventor
Arvid Bjorklund
By his Attorneys
Merchant and Keyre Patented Dec. 1, 1931

1,834,762

UNITED STATES PATENT OFFICE

ARVID BJORKLUND, OF MINNEAPOLIS, MINNESOTA

SPLITTING MACHINE

Application filed March 8, 1929. Serial No. 345,375.

My present invention has for its object to provide a highly efficient splitting machine intended for general use but especially well adapted for use in removing the tread stock from the carcass of a worn-out tire casing for reclaiming the fabric stock thereof and for dividing said carcass, between certain of the plies thereof, to provide stock of two or more plies from which tire patches, tire boots, tire reliners and the like may be manufactured.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 3 is a fragmentary view principally in longitudinal vertical section taken substantially on the line 3—3 of Fig. 2;

Fig. 4 is a fragmentary detail view principally in section taken on the line 4—4 of Fig. 2;

Fig. 5 is a fragmentary view partly in plan and partly in longitudinal horizontal section taken substantially on the line 5—5 of Fig. 3;

Fig. 7 is a fragmentary detail view principally in section taken on the line 7—7 of Fig. 4, on an enlarged scale;

Fig. 8 is a view principally in front elevation of the parts shown in Fig. 7, with some parts sectioned on the line 8—8 of Fig. 7;

Fig. 9 is a detail view principally in transverse vertical section taken on the line 9—9 of Fig. 3, on an enlarged scale; and Fig. 10 is a detail view principally in section taken on the line 10—10 of Fig. 7.

Figure 1:
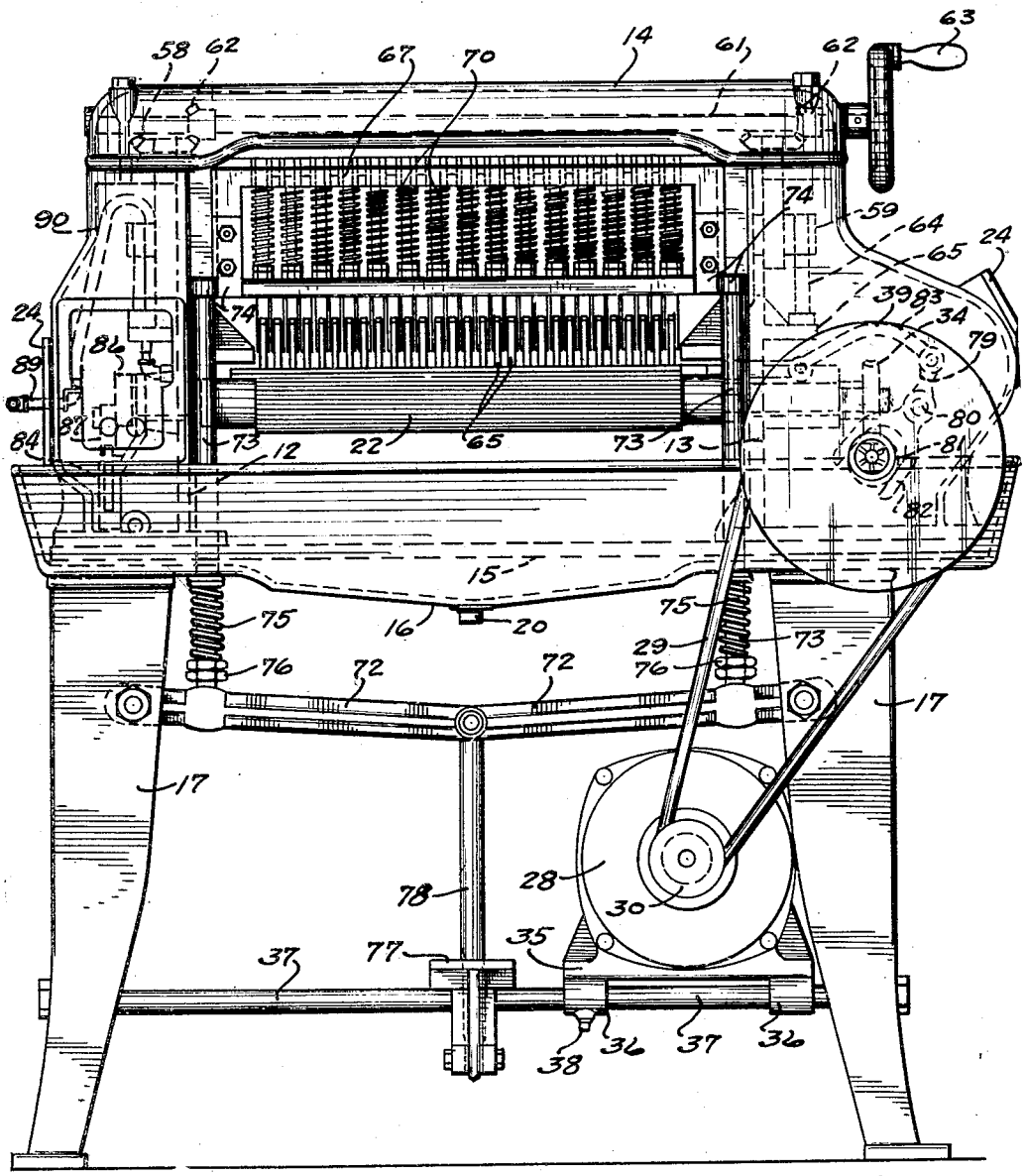
Fig. 1 is a front elevation of the splitting machine.

The splitting machine includes a main frame comprising pedestal-like end casings 12 and 13 and a top casing member 14 supported on said end casings and rigidly but detachably secured thereto by bolts or otherwise. These end casings 12 and 13 are mounted on a base plate 15 which in turn is removably mounted in a sink 16 supported on a pair of leg brackets 17 and detachably secured thereto by bolts or other fastening devices. Transverse ribs 18 are formed on the bottom of the sink 16 and support the base plate 15 above the bottom of said sink for drainage, as will presently appear. The end casings 12 and 13 and base plate 15 are rigidly connected to each other and to the sink 16 by bolts 19. Said sink 16 at its longitudinal center has a depressed portion for collecting water therein and a drain pipe 20 leads from this depressed portion of the sink 16.

A long, flat, horizontally disposed knife blade 21 is provided for splitting a tire casing A to remove its tread stock B from the carcass C thereof and for splitting said carcass between certain of its plies by cutting the cement or vulcanized rubber connecting the same. The tire casing A or its carcass C is fed to the knife blade 21 by a driven feed roll 22 and a co-acting pressure device 23. By reference to Fig. 9, it will be noted that the pressure device 23 is mounted directly over the feed roll 22 and the knife blade 21 extends perpendicular to a plane extending through the axes of said feed roll and pressure device with its cutting edge spaced rearward from said plane so that the cutting action of the knife blade 21 takes place as the tire casing passes from between the feed roll 22 and pressure device 23 thus preventing undue friction between said blade and the stock of the tire casing.

Access may be had to the interiors of the end casings 12 and 13 through hand holes formed in the outer walls thereof and normally closed by cover plates 24. The bottom of the top casing 14 is open at its intermediate portion between the end casings 12 and 13 to afford access to the interior of said casing.

The periphery of the feed roll 22 is longitudinally corrugated to form ratchet-like teeth 25 to increase the feeding action of said roll. This feed roll 22 has on its ends trunnions 26 journaled in bearings 27 formed with the inner walls of the end casings 12 and 13 and extending into said casings, see Fig. 3. The feed roll 22 is driven in the direction of the arrow marked thereon in Fig. 9 from an electric motor 28 by the following connections, to wit:

A belt 29 runs over a relatively small grooved pulley 30 on the armature shaft of said motor and a relatively large grooved pulley 31 keyed to a transverse shaft 32 journaled in bearings in the front and rear walls of the end casing 13. A worm 33 on the shaft 32 meshes with a worm gear 34 on the right hand trunnion 26 and completes the driving connections from the motor 28 to the feed roll 22.

The motor 28 is provided with a base 35 having depending sleeve bearings 36 slidably mounted on a pair of tie bars 37 which rigidly connect the leg brackets 17. A set screw 38 in one of the sleeve bearings 36 is arranged to impinge against the respective tie bar 37 and hold the motor 28 where adjusted on the tie bars 37. Obviously by adjusting the motor 28 on the tie bars 37 the slack in the belt 29 may be taken up at will.

Figure 2:
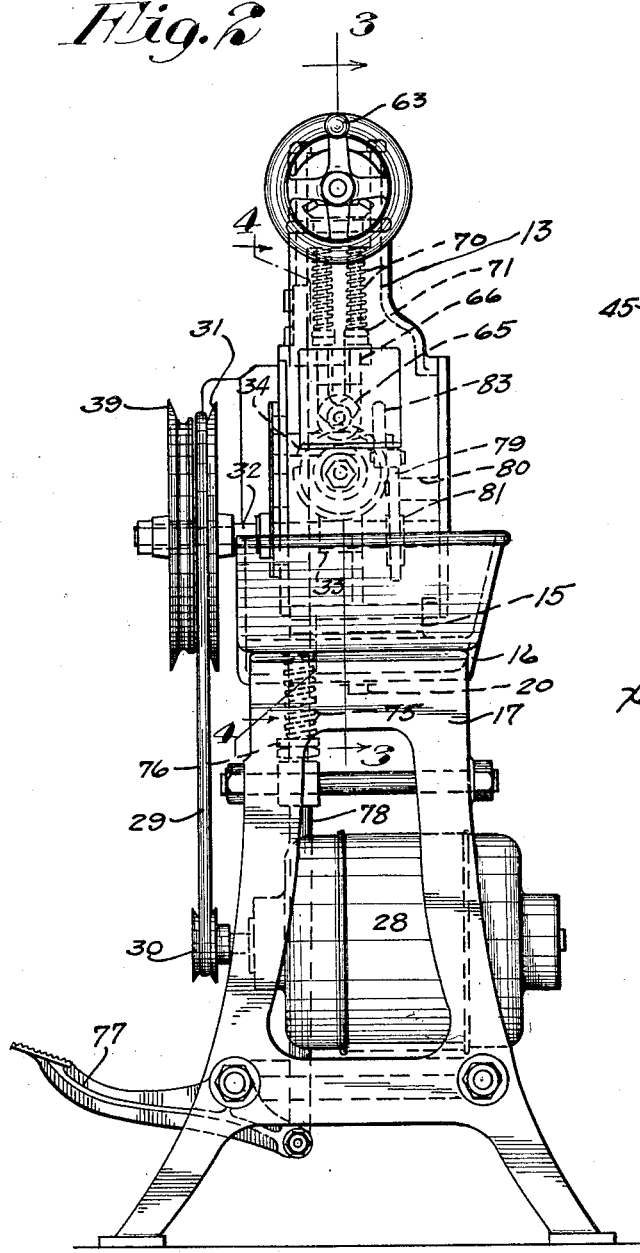
Fig. 2 is a right end elevation of the same.
Figure 6:
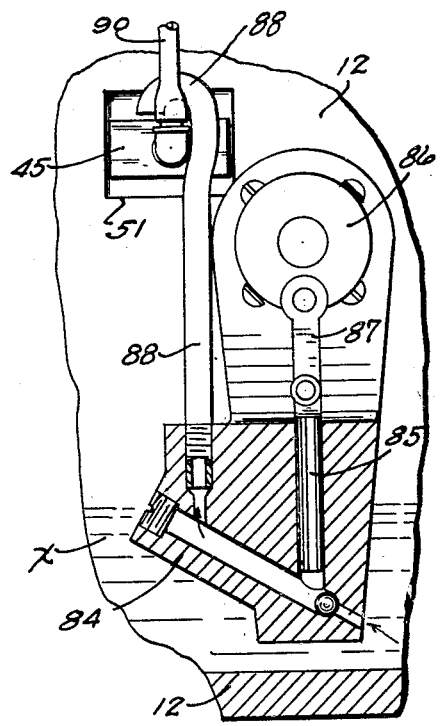
Fig. 6 is a fragmentary detail view some parts sectioned on the line 6—6 of Fig 3, on an enlarged scale.

An idle pulley 39 that is identical with the driven pulley 31 is loosely journaled on the shaft 32. By reference to Fig. 2 it will be noted that the opposing flanges of the pulleys 31 and 39 are relatively low so that the belt 29 may be readily shifted from one of said pulleys to the other. The purpose of the loose pulley 39 is to stop the operation of the machine by shifting the belt 29 from the driven pulley 31 to the idle pulley 39 without stopping said motor.

The knife blade 21 is removably mounted in a rectangular secondary holder 40 having in its front face a channel seat 41 which terminates short of the ends of said holder. Set screws 42 in the ends of the secondary holder 40 impinge against the ends of the knife blade 21 and detachably but rigidly hold said knife blade in its seat 41. A pair of adjustable abutments in the form of set screws extend into the seat 41 from the back of the secondary holder 40 and afford a base of resistance for the knife blade 21. As the cutting edge of the knife blade 21 wears away from use and grinding said knife blade may be projected from its seat 41 by means of the abutments 43 so that its cutting edge is always substantially the same distance from the front face of the secondary holder 40 and has a definite and constant position in respect to the feed roll 22 and pressure device 23.

The secondary holder 40 is removably mounted in a channel seat 44 in the front face of a rectangular main holder 45 and which seat terminates short of the ends of said main holder. As one means for detachably securing the secondary holder 40 to the main holder 45 there is rigidly secured to said secondary holder a pair of screw-threaded studs 46 which project rearward from the back of the secondary holder 40 through bores in the main holder 45. Wing nuts 47 applied to the studs 46 engage the back of the main holder 45 as a base of resistance and hold the secondary holder 40 tightly drawn onto the bottom of the seat 44. It may be here stated that the width of the seats 41 and 44 are such as to snugly receive the knife blade 21 and secondary holder 40, respectively, and thereby prevent lateral movements thereof. When it is desirable to grind the knife blade 21 it may be removed from the machine simply by detaching the nuts 47 from the studs 46 and withdrawing the secondary holder 40 from its seat 44 in the main holder 45.

The main holder 45 is mounted in a pair of bearings 48 for endwise reciprocatory movement and which holder imparts a like movement to the knife blade 21 that is parallel to a plane extending through the axes of the feed roll 22 and pressure device 23. Said bearings 48 are slidably mounted in vertical ways 49 on the inner walls of the end casings 12 and 13 above the feed roll 22. Deep notches 50 are formed in the opposing faces of the bearings 48 to afford clearance for the end portions of the secondary holder 40 and permit the required reciprocatory movement thereof. The end portions of the main holder 45 extend into the end casings 12 and 13 through apertures 51 in the inner walls thereof.

Wearing plates 52 in the bearings 48 engage the back of the main holder 45 and hold the same for true straight line reciprocatory movement in said bearings. These wearing plates 52 are held in position by studs 53 on the backs thereof and which studs project into bore-like seats 54 in the bearings 48 with freedom for endwise movement to permit the wearing plates to follow the main holder 45 as wear takes place. Pairs of set screws 55 having screw-threaded engagement with the bearings 48 impinge against the backs of the wearing plates 52 and hold the same in contact with the back of the main holder 45 to prevent transverse movement of said main holder but at the same time permit free reciprocatory movement of said main holder.

On the right hand end of the main holder 45 is a bifurcated coupling head 56 to which connections from the shaft 32 are attached for reciprocating said holder, as will presently appear. The bearings 48 are adjustably held suspended in the ways 49 by a pair of screws 57 loosely journaled in the top of the end casings 12 and 13 and the bottom of the top casing 14 and have on their upper ends beveled gears 58 the hubs of which rest on the bottom of said top casing and hold said screws suspended therefrom. These screws 58 have screw-threaded engagement with nut-acting lugs 59 on the bearings 48 which extend into the end casings 12 and 13 through apertures 60 in the opposing walls of said casings and which apertures are of such size as to permit vertical adjustment of the bearings 48 by the screws 57.

The bearings 48 are manually and simultaneously raised or lowered by a horizontal shaft 61 journaled in bearings in the ends of the top casing 14 and have pinions 62 which mesh with the gears 58. On the right hand end of the shaft 61 is a hand crank 63 by which the shaft 61 may be operated to rotate the screws 57 and thereby raise or lower the bearings 48. Obviously this adjustment of the screws 57 sets the knife blade 21 different distances from the feed roll 22 and determines the thickness of the cut to be made thereby through a piece of work held between the feed roll 22 and pressure device 23.

To limit the approaching movement of the knife blade 21 toward the feed roll 22 and thereby prevent the same from coming in contact therewith, there is provided a pair of adjustable stops in the form of depending screws 64. These screws 64 have screw-threaded engagement with the nut-acting lugs 59 and their heads are arranged to engage stop flanges 64' formed with the inner walls of the end casing 12 and 13 below the apertures 60 and project into said casings. By adjusting the stop screws 64 in the nut-acting members 59 the operative length of said screws may be varied, at will, and thereby vary the adjustment of the knife blade 21 in respect to the feed roll 22.

Referring now in detail to the pressure device 23 the same includes a multiplicity of rollers 65 journaled in the bifurcated lower ends of upright stems 66 which are mounted in the upper and lower members of a rectangular secondary frame 67 for individual endwise sliding movements. This secondary frame 67 is mounted in vertical ways 68 on the opposing faces of the bearings 48 for vertical sliding movement. Normally the secondary frame 67 rests on stop lugs 69 on the bearings 48, see Fig. 3, for raising movement therefrom.

Coiled springs 70 encircling the stems 66 are compressed between nuts 71 on said stems and the top member of the secondary frame 67 and which nuts are normally held by the springs 70 on the lower member of said frame to limit the movement of the rollers 65 toward the feed roll 22. In order to closely position the rollers 65 with the lateral distances between adjacent rollers less than the diameter of the springs 70 and stems 66 are staggered and alternately arranged on opposite sides of a vertical plane extending through the axes of the feed roll 22 and pressure device 23.

The lower end portions of the stems 66 are curved inwardly and hold the rollers 65 with their axes in a vertical plane projecting from the axis of the feed roll 22, see Fig. 9. The adjustment of the nuts 71, as shown, is such as to hold the stems 66 with the axes of the rollers 65 normally aligned. By adjusting the nuts 71 on the stems 66 the approaching movement of the rollers 65 toward the knife blade 21 and feed roll 22 may be varied at will. These nuts 71 by their engagement with the lower member of the secondary frame 67 act as stops to prevent said rollers from coming in contact with the knife blade 21. In some instances it might be desirable to adjust the nuts 71 on the stems 66 to hold the rollers 65 different distances from the feed roll 22 when in their normal positions.

To manually and simultaneously raise the rollers 65 to permit a piece of work to be inserted between the feed roll 22 and said rollers, there is provided the following connections, to wit:

A toggle lever 72 which extends horizontally between the leg brackets 17 and has the outer ends of its arms pivoted thereto to permit vertical straightening and buckling movements of said toggle lever. The arms of the toggle lever 72, near their pivoted ends, are provided with a pair of upright connecting rods 73 the lower ends of which are loosely attached to said arms and the upper ends of which are attached at 74 to the upright member of the secondary frame 67 at the back thereof. Coiled springs 75 encircling the connecting rods 73 are compressed between the bottom of the sink 16 and abutments in the form of nuts 76 on said rods. The connecting rods 73 work through openings in the bottom of the sink 16 and suitable packings, not shown, will be provided to form watertight joints therewith. A foot treadle 77 is intermediately fulcrumed on the front tie-rod 37 and its inner or short end is connected by an upright link 78 to the toggle lever 72 at its intermediate pivot.

By depressing the outer or long end of the foot treadle 77 the toggle lever 72 will be buckled and thereby through the connecting rod 73 lift the secondary frame 67 and hence the roller 65 from the feed roll 22. The coiled springs 75 yieldingly and normally hold the secondary frame 67 on the stop lug 69 so that it moves with the bearings 48 during their adjustments by the screws 57 and the tension of said springs is such as to securely hold said frame from lifting as the rollers 65 are moved in respect thereto by a piece of work passing over the feed roll 22.

The knife blade 21 is reciprocated from the shaft 32 by an upright lever 79 intermediately fulcrumed to a shaft 80 in the end casing 13 and journaled in bearings on the front and rear walls thereof. This lever 79 is operated by an eccentric 81 on the shaft 32 and which eccentric works in a fork 82 on the lower end of said lever. A link 83 connects the upper end of the lever 79 to the connection 56 on the main holder 45. This link 83 is curved to clear the gear 34 over which it works.

The left hand portion of the main holder 45, where the same works in the respective bearing 48, is lubricated as well as the way 49 in which said bearing works by means of an oil pump which, as shown, includes a casing 84 and a piston 85 working therein. This casing 84 is rigidly secured to the inner end of the left hand bearing 27 and held suspended in a body of oil X in the end casing 12 and the piston 85 is operated by a crank 86 on the left hand trunnion 26 and which crank is attached by the link 87 to the piston 85.

For the purpose of this case it is not thought necessary to give the detail action of the oil pump with the exception that it delivers oil through a goose neck 88 on to the upper face of the main holder 45 within the end casing 12. Surplus oil from the main holder 45 is gravity fed onto the left hand bearing 27, crank 86, link 87 and piston 85 and keeps the same lubricated as well as the left hand trunnion 26.

The right hand end portion of the main holder 45, where the same works in the right hand bearing 48, and the way 49 in which said bearing works, are lubricated as well as all of the movable parts in the end casing 13 and the respective trunnion 26 by splash from a body of oil Y in the end casing 13 produced by certain of said movable parts.

The knife blade 21 is lubricated to cause the same to efficiently cut the tread B from the carcass C or cut said carcass between certain of the plies thereof by feeding water onto the upper and lower surfaces of said knife blade at a plurality of longitudinally spaced points. The system illustrated for lubricating the knife blade 21 includes a water supply pipe 89 leading from any suitable source of supply under the desired pressure and which pipe is connected by a flexible hose 90 to the receiving end of a longitudinally extended conduit 91 in the left hand end portion of the main holder 45. This hose 90 is of such length as to permit the required reciprocatory movement of the main holder 45. The conduit 91 leads to a second conduit in the form of a longitudinally extended groove 92 formed in the bottom of the channel seat 44 and short lateral conduits 93 in the secondary holder 40 leads from the groove 42 to the knife blade 21.

It will be noted that the groove 92 terminates short of the ends of the secondary holder 40 and is completely closed by said holder except at the discharge end of the conduit 91 and the intake ends of the lateral conduits 93. The lateral conduits 93 are in the form of bores which extend completely through the secondary holder 40 from the front to the rear thereof in the plane of the knife blade 21 and the diameters thereof are slightly greater than the thickness of the knife blade 21 so that their delivery end portions are in the form of grooves between which said blade extends for the delivery of water onto the upper and lower surfaces of the knife blade 21, see Figs. 8 and 9. Water discharged from the lateral conduits 93 after lubricating the knife blade 21 and any leakage which may take place from the groove 92 is precipitated into the sink 16 and carried off through the drain pipe 20.

Before a tire casing is fed into the machine the beads thereof are cut therefrom and the tire casing transversely divided so that the same may be fed endwise into the machine. The operator then raises the pressure device 23 by stepping on the throttle 77 and places one end of the tire casing between the feed roll 22 and pressure device 23 with the flat side of said casing resting on said feed roll. Upon releasing the foot treadle 77 the feed device is lowered which brings its rollers 65 into contact with the tread of said tire casing and presses said casing onto the feed roll 22 so that its inner side is flat with the plies thereof parallel to said feed roll as well as the knife blade 21. As the pressure rollers 65 are brought into contact with the tread of the tire casing they are automatically and individually adjusted over the irregular tread surface and due to the fact that they are so closely positioned in respect to each other there is no chance for the tire casing to lift from the feed roll 22. Due to the transverse curvature of the tire casing the tension of the springs 70 are progressively increased from the longitudinal edges of said casing to the center thereof and this increased tension of said springs comes just where the greatest pressure is required to hold the tire casing flat on the feed roll 22. With the tire casing thus positioned to be fed through the machine to the knife blade 21 said knife blade is adjusted by operating the hand crank 63 to position and cause said knife blade 21 to cut or split the tread from the carcass of the tire casing.

To start the feeding action of the feed roll 22 and reciprocate the knife blade 21 it is only necessary for the operator to shift the belt 29 from the idle pulley 39 to the driven pulley 31. After the tread has been removed from the tire casing the operator feeds said casing through the machine in the same manner but before doing so adjusts the knife 21 to cut the cement or vulcanized rubber between certain of the plies of the carcass depending on how many plies are to be left in the stock removed from the carcass. As the carcass is firmly held on the feed roll 22 the knife blade 21 does not cut or damage the fabric comprising the plies between which the knife blade 21 is operated.

What I claim is:

1. In a machine of the class described, a knife and a driven feed roll and a co-acting pressure device for feeding a piece of work to the knife, said pressure device being mounted for movement toward or from the knife and under strain to move toward the same, manually controlled power means for moving the pressure device away from the knife, and common means for adjusting the knife relative to the feed roll and the approaching movement of the pressure device in respect to the feed roll.

2. In a machine of the class described, a knife, a driven feed roll and a co-acting pressure device comprising a plurality of laterally spaced rollers having stems on which they are journaled, said stems being mounted in staggered arrangement alternately on opposite sides of a plane extending substantially radially from the axis of the feed roll, and springs yieldingly and individually holding the stems with the rollers pressed toward the feed roll.

3. In a machine of the class described, a knife, a driven feed roll and a co-acting pressure device comprising a plurality of laterally spaced rollers having stems on which they are journaled, said stems being mounted in staggered arrangement alternately on opposite sides of a plane extending substantially radially from the axis of the feed roll, and springs yieldingly and individually holding the stems with the rollers pressed toward the feed roll, said stems at their inner ends being arranged to hold the rollers with their axes substantially in said plane.

4. In a machine of the class described, a knife, a driven feed roll and a co-acting pressure device comprising a plurality of laterally spaced rollers having stems on which they are journaled, said stems being mounted in staggered arrangement alternately on opposite sides of a plane extending substantially radially from the axis of the feed roll, coiled springs encircling the stems and yieldingly and individually holding the same with the rollers pressed toward the feed roll, said stems at their inner ends being arranged to hold the rollers with their axes substantially in said plane, the space between adjacent rollers being less than the diameter of the springs.

5. In a machine of the class described, a knife, and a driven feed roll and a co-acting pressure device for feeding a piece of work to the knife, said pressure device including a plurality of laterally spaced rollers yieldingly and individually held pressed toward the feed roll, positive means for bodily adjusting the pressure device to simultaneously move its rollers away from the feed roll, and common means for adjusting the knife relative to the feed roll and the approaching movement of the pressure device in respect to the feed roll.

6. In a machine of the class described, a knife, and a driven feed roll and a co-acting pressure device for feeding a piece of work to the knife, said pressure device including a plurality of laterally spaced rollers yieldingly and individually held pressed toward the feed roll, spring means yieldingly holding the pressure device pressed toward the feed roll, positive means for bodily adjusting the pressure device against the action of the spring means to simultaneously move its rollers away from the feed roll, and common means for adjusting the knife relative to the feed roll and the approaching movement of the pressure device in respect to the feed roll under the action of said spring means.

7. In a machine of the class described, a knife, and a driven feed roll and a co-acting pressure device for feeding a piece of work to the knife, said pressure device including a plurality of laterally spaced rollers yieldingly and individually held pressed toward the feed roll, spring means yieldingly holding the pressure device pressed toward the feed roll, means for bodily adjusting the pressure device relative to the knife and against the action of the spring means to simultaneously move its rollers away from the feed roll and knife, positive stop means for the pressure device to limit its movement toward the feed roll and normally hold the rollers predetermined distances from the feed roll, and means for adjusting the stop means different distances from the feed roll.

8. In a machine of the class described, the combination with a frame having a pair of movable bearings, a reciprocatory knife mounted on the bearings, a driven feed roll and a co-acting pressure device for feeding a piece of work to the knife, said feed roll being journaled on the frame and the pressure device normally loosely resting on seats on the bearings for common movements with the bearings toward or from the feed roll and with freedom for relatively like movements relative to the bearings, means for adjusting the bearings for setting the knife and pressure device different distances from the feed roll, and means for bodily adjusting the pressure device to move the same away from the knife and feed roll.

9. In a machine of the class described, the combination with a frame having a pair of movable bearings, a reciprocatory knife mounted on the bearings, a driven feed roll and a co-acting pressure device for feeding a piece of work to the knife, said feed roll being journaled on the frame and the pressure device normally loosely resting on seats on the bearings for common movements with the bearings toward or from the feed roll and with freedom for relatively like movements, means for adjusting the bearings for setting the knife and pressure device different distances from the feed roll, and stop means to limit the movement of the bearings toward the feed roll.

10. In a machine of the class described, the combination with a frame having a pair of movable bearings, a reciprocatory knife mounted on the bearings, a driven feed roll and a co-acting pressure device for feeding a piece of work to the knife, said feed roll being journaled on the frame and the pressure device normally loosely resting on seats on the bearings for common movements with the bearings toward or from the feed roll and with freedom for relatively like movements, means for adjusting the bearings for setting the knife and pressure device different distances from the feed roll, adjustable stop means for limiting the movement of the bearings toward the feed roll by their adjusting means, and connections operable to move the pressure device in respect to the bearings and away from the feed roll, said connections including spring means normally and yieldingly holding the feed device pressed toward the feed roll and onto its seats on the bearings.

11. In a machine of the class described, the combination with a main frame having a pair of movable bearings, a reciprocatory knife mounted in the bearings, a driven feed roller and a co-acting pressure device for feeding a piece of work to the knife, said feed roll being journaled on the main frame, said pressure device including a movably mounted secondary frame, said bearings and secondary frame being independently movable in planes parallel to a plane radiating substantially from the axis of the feed roll, means for adjusting the bearings to set the knife different distances from the feed roll, stop means for limiting the movement of the pressure device toward the feed roll, and operating connections for moving the pressure device away from the feed roll including a toggle lever, connecting rods between the arms of the toggle lever and secondary frame, spring means normally holding the toggle lever substantially straight with its connecting rods holding the pressure device in engagement with the stop means, and manually operated means for buckling the toggle lever to move the pressure device away from the knife and feed roll.

12. In a machine of the class described, the combination with a main frame having a pair of movable bearings, a reciprocatory knife mounted in the bearings, a driven feed roller and a co-acting pressure device for feeding a piece of work to the knife, said feed roll being journaled on the main frame, said pressure device including a movably mounted secondary frame, said bearings and secondary frame being independently movable in planes parallel to a plane radiating substantially from the axis of the feed roll, means for adjusting the bearings to set the knife different distances from the feed roll, stop means for limiting the movement of the pressure device toward the feed roll, operating connections for moving the pressure device away from the feed roll, including a toggle lever, connecting rods between the arms of the toggle lever and secondary frame, spring means normally holding the toggle lever substantially straight with the pressure device held against the stop means and manually operated means for buckling the toggle lever to move the pressure device away from the knife and feed roll, said pressure device further including a multiplicity of laterally spaced rollers journaled on stems mounted on the secondary frame for endwise movement in the direction of the movement of the secondary frame, and springs individually holding the stems with the rollers pressed toward the feed roll.

13. In a machine of the class described, the combination with a main frame having a pair of movable bearings, a reciprocatory knife mounted in the bearings, a driven feed roll and a co-acting pressure device for feeding a piece of work to the knife, said feed roll being journaled on the main frame, operating connections for simultaneously adjusting the bearings for setting the knife different distances from the feed roll, said pressure device including a secondary frame adjustably mounted on the bearings, said bearings and secondary frame being independently movable in planes parallel to a plane that radiates substantially from the axis of the feed roll, stop means on the bearings for limiting the movement of the pressure device toward the feed roll, and connections operable to move the pressure device on the bearings away from the feed roll, said connections including spring means normally and yieldingly holding the feed device pressed toward the feed roll and against the stop means.

In testimony whereof I affix my signature.

ARVID BJORKLUND.